(12) United States Patent
Ikegaya et al.

(10) Patent No.: US 7,769,969 B2
(45) Date of Patent: *Aug. 3, 2010

(54) METHOD OF MONITORING STATUS INFORMATION OF REMOTE STORAGE AND STORAGE SUBSYSTEM

(75) Inventors: Naoko Ikegaya, Sagamihara (JP); Sumio Goto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 12/149,292

(22) Filed: Apr. 30, 2008

(65) Prior Publication Data

US 2008/0235446 A1    Sep. 25, 2008

Related U.S. Application Data

(63) Continuation of application No. 11/207,774, filed on Aug. 22, 2005, now Pat. No. 7,380,079, which is a continuation of application No. 10/788,453, filed on Mar. 1, 2004, now Pat. No. 7,380,078.

(30) Foreign Application Priority Data

Nov. 21, 2003  (JP) .............................. 2003-391812

(51) Int. Cl.
    *G06F 13/14* (2006.01)
(52) U.S. Cl. ................ 711/156; 711/162; 709/211
(58) Field of Classification Search .............. None
    See application file for complete search history.

(56) References Cited

U.S. PATENT DOCUMENTS

| | | |
|---|---|---|
| 4,724,518 A | 2/1988 | Steps |
| 4,881,074 A | 11/1989 | Reichbauer et al. |
| 5,742,792 A | 4/1998 | Yanai et al. |
| 5,892,937 A | 4/1999 | Caccavale |

(Continued)

FOREIGN PATENT DOCUMENTS

EP    0869438    10/1998

(Continued)

OTHER PUBLICATIONS

Remote Storage Disk Control Device with Function to Transfer Commands to Remote Storage Devices, pp. 1-86 . . . Fig. 1-28.

(Continued)

*Primary Examiner*—Hetul Patel
*Assistant Examiner*—Kaushikkumar Patel
(74) *Attorney, Agent, or Firm*—Mattingly & Malur, P.C.

(57) ABSTRACT

A host computer acquires remote copy status information of storage subsystems that are not directly coupled to the host computer.

Each storage subsystem comprises: a unit which receives a status information acquisition command from the host computer; a unit which analyses the received command to judge whether the storage subsystem in question is a target of the command; a unit which sends the command to a downstream storage subsystem connected to the storage subsystem in question when the storage subsystem in question is not the target; and a unit which sends status information to an upstream storage subsystem connected to the storage subsystem in question when the status information is received from the downstream storage subsystem.

22 Claims, 11 Drawing Sheets

700

| STORAGE SITE | PAIR OF VOLUMES | COPY STATUS | TRANSFER RATE | CACHE USAGE | UPDATE TIME |
|---|---|---|---|---|---|
| 1300A1⇒1300B1 | P⇒S | P80% | 10bps | 30% | 10:00:00 |
| 1300B1⇒1300B1 | | | | | |
| 1300B1⇒1300C1 | | | | | |
| 1300C1⇒1300C1 | | | | | |
| | | | | | |

710 / 720 / 731 / 732 / 733 / 740 ; 730

U.S. PATENT DOCUMENTS

| | | |
|---|---|---|
| 6,196,735 B1 | 3/2001 | Inamine |
| 6,393,528 B1 | 5/2002 | Arimilli et al. |
| 6,438,110 B1 | 8/2002 | Rai et al. |
| 6,453,354 B1 | 9/2002 | Jiang et al. |
| 6,457,109 B1 | 9/2002 | Mililo et al. |
| 6,484,187 B1 | 11/2002 | Kern et al. |
| 6,526,419 B1 | 2/2003 | Burton et al. |
| 6,529,944 B1 | 3/2003 | LeCrone |
| 6,529,994 B1 | 3/2003 | Bleidt et al. |
| 6,587,935 B2 | 7/2003 | Ofek |
| 6,591,351 B1 | 7/2003 | Urabe et al. |
| 6,611,903 B2 | 8/2003 | Fujimoto et al. |
| 6,631,477 B1 | 10/2003 | LeCrone et al. |
| 6,658,540 B1 | 12/2003 | Sicola et al. |
| 6,681,392 B1 | 1/2004 | Henry et al. |
| 6,974,391 B2 | 12/2005 | Ainsworth et al. |
| 6,996,672 B2* | 2/2006 | Lubbers et al. ............ 711/114 |
| 7,203,806 B2 | 4/2007 | Kasako et al. |
| 7,219,201 B2 | 5/2007 | Kasako et al. |
| 2002/0004890 A1 | 1/2002 | Ofek et al. |
| 2002/0078296 A1 | 6/2002 | Nakamura et al. |
| 2002/0103968 A1 | 8/2002 | Grover |
| 2002/0143999 A1* | 10/2002 | Yamagami ................ 709/249 |
| 2002/0194428 A1 | 12/2002 | Green |
| 2003/0078903 A1 | 4/2003 | Kimura et al. |
| 2003/0093597 A1 | 5/2003 | Marshak et al. |
| 2003/0105931 A1 | 6/2003 | Weber et al. |
| 2003/0126387 A1 | 7/2003 | Watanabe |
| 2003/0163553 A1 | 8/2003 | Kitamura et al. |
| 2003/0229764 A1 | 12/2003 | Ohno et al. |
| 2004/0073831 A1 | 4/2004 | Yanai et al. |
| 2004/0098547 A1 | 5/2004 | Ofek et al. |
| 2004/0158652 A1 | 8/2004 | Obara |
| 2004/0230859 A1* | 11/2004 | Cochran et al. ................ 714/2 |

FOREIGN PATENT DOCUMENTS

| | | |
|---|---|---|
| EP | 1024439 | 8/2000 |
| JP | 04-175032 | 6/1992 |
| JP | 8137772 | 5/1996 |
| JP | 2000-242585 | 9/2000 |
| JP | 2002 189570 | 7/2002 |
| JP | 2002 334049 | 11/2002 |
| JP | 2002 542526 | 12/2002 |
| JP | 2003-316671 | 11/2003 |
| WO | 00/49500 | 8/2000 |
| WO | 0049500 | 8/2000 |

OTHER PUBLICATIONS

Remote Storage Disk Control Device and Method for Controlling the Same, pp. 1-51 . . . Figs. 1-14.

U.S. Appl. No. 10/748,886, filed Dec. 30, 2003.

U.S. Appl. No. 10/820,629, filed Apr. 8, 2004.

* cited by examiner

| | | | | | | |
|---|---|---|---|---|---|---|
| 510 | CONCATENATED STORAGE SITE NUMBER | 6 | | | | |
| 520 | CONCATENATION ORDER INFORMATION | 1 | 2 | 3 | ... | 6 |
| 530 | STORAGE SITE IDENTIFIER | 1300A1 | 1300B1 | 1300C1 | | 1300F1 |

500

| | | | | | | |
|---|---|---|---|---|---|---|
| 610 | STORAGE SUBSYSTEM NUMBER | 7 | | | | |
| 620 | CONCATENATION ORDER INFORMATION | 1 | 2 | 3 | ... | 7 |
| 630 | STORAGE SUBSYSTEM IDENTIFIER | 1300A1 | 1300A2 | 1300A3 | | 1300A7 |

| STORAGE SITE (710) | PAIR OF VOLUMES (720) | COPY STATUS (731) | TRANSFER RATE (732) | CACHE USAGE (733) | UPDATE TIME (740) |
|---|---|---|---|---|---|
| 1300A1⇒1300B1 | P⇒S | P80% | 10bps | 30% | 10:00:00 |
| 1300B1⇒1300B1 | | | | | |
| 1300B1⇒1300C1 | | | | | |
| 1300C1⇒1300C1 | | | | | |
| | | | | | |

(730 spans columns 731–733)

| COMMAND IDENTIFIER (860) | REMOTE COPY STATUS ACQUISITION COMMAND TYPE (810) | ACQUISITION TARGET IDENTIFIER (820) | PAIR IDENTIFIER (830) | TYPE-OF-INFORMATION-TO-ACQUIRE (840) | INTERVAL (850) |
|---|---|---|---|---|---|

| COMMAND IDENTIFIER (910) | STATUS INFORMATION (920) | COMMAND TYPE (930) | UPDATE TIME (940) |
|---|---|---|---|

METHOD OF MONITORING STATUS INFORMATION OF REMOTE STORAGE AND STORAGE SUBSYSTEM

The present application is a continuation application of U.S. Ser. No. 11/207,774, filed Aug. 22, 2005, now U.S. Pat. No. 7,380,079 which is a continuation of application Ser. No. 10/788,453, filed Mar. 1, 2004, now U.S. Pat. No. 7,380,078 which claim priority to JP 2003-391812, filed Nov. 21, 2003, the contents of all of which are incorporated herein by reference.

BACKGROUND OF THE INVENTION

The present invention relates to a storage subsystem and a technique of controlling a storage subsystem, and in particular, to a technique of collecting status information etc., of a storage subsystem that is placed, for example, in a remote place and not directly coupled to a host computer.

As information-oriented society develops, computer systems are introduced all over the world, and data quantity processed there is increasing explosively. Further, importance of data treated in computer systems rises, and high reliability is required for keeping data, and it becomes social duty of an information system to prevent loss of data held in it by any kind of disaster.

In such a system, to ensure reliability of data, a storage itself is multiplied. Data outputted from a processing host computer is not only stored into a storage directly coupled to the host computer, but also copied to another storage via the directly coupled storage.

In the following, a storage directly coupled to a host computer is called a direct-coupled storage, and a storage that receives data not directly from the host computer but through the direct-coupled storage is called a remote storage.

Generally, a method of copying data to a remote storage through a direct-coupled storage is called remote copy, and applied to an information system that requires high reliability. According to this remote copy technique, even when a failure occurs in a storage so that the storage falls into an inoperable state, system operation can be continued using data of another storage.

When especially high reliability is required, it is possible to employ a method in which a multitude of remote storages are concatenated, and data is copied sequentially to the concatenated remote storages to increase multiplicity (redundancy) of data and to increase reliability.

For example, in the case of an apparatus for cascading and storing data, which is disclosed in Published Japanese Translation No. 2002-542526 of International Application (Patent Document 1), data is processed in a production site with a host computer and written into a direct-coupled storage and then, redundant data store is transparently provided to two or more remote storage. When a first remote storage receives data from the production site, the first remote storage transfers the data to a second remote storage located in a remoter place. At that time, the first remote storage holds a copy progress status. When data copy operation to the second remote storage is completed, the first remote storage reports the completion to the direct-coupled storage in the production site.

Further, to enhance integrity against disaster such as an earthquake, it is favorable that remote storages are located at remoter places as far away as possible. However, remote copy to a remote place takes time in data transfer. To solve this problem, there is a method in which, at the time of data update processing from a host computer, data transfer to remote storages is performed asynchronously with transfer (host transfer) from the host computer to a direct-coupled storage, to realize efficient remote copy between a plurality of storage subsystems, as disclosed, for example, in Japanese Patent Application Laid-Open No. 2002-334049 (Patent Document 2).

According to the technique disclosed in Patent Document 2, at a point of time when data transferred from the host computer is stored in an internal buffer of the direct-coupled storage, completion of reception is acknowledged to the host computer. And, thereafter, the host computer monitors the utilization factor of the internal buffer of the direct-coupled storage to adjust data update intervals.

Further, in the case where data is inherited at a point of time when a failure occurs in a storage, it is necessary to ensure consistency of data between multiplied storages. As a technique of establishing consistency of data, there is known a technique in which consistency of data contents is ensured as follows. Namely, a pair of volumes consisting of a volume (which stores data) of a direct-coupled storage and a volume (as the copy destination of the data mentioned) of a remote storage is defined, and a set of pairs of volumes are managed generally as a group, in order to maintain the order of data update, as disclosed, for example, in Japanese Patent Application Laid-Open No. 2002-189570.

The technique disclosed in Patent Document 3 is a duplication method to recover a volume copy quickly within the group when an event that temporarily stops copying, owing to maintenance or disaster. According to the present technique, a data center in a remote place can take over processing at the time when an information system suffers from disaster.

SUMMARY OF THE INVENTION

The techniques disclosed in the above-mentioned Patent Documents 1 to 3 can realize efficient remote copy between a direct-coupled storage and remote storages and realize multiple data.

Recently, quantity of treated data is increasing, and, in some cases, a plurality of direct-coupled storages is connected to a host computer, and each direct-coupled storage is connected with remote storages. In the case where data is transferred from one host computer to a plurality of direct-coupled storages, there is a desire to generally collect various kinds of information, such as remote copy status information, on each of the direct-coupled storages and each of the remote storages sequentially concatenated from a direct-coupled storage. This is desired for the host computer to perform processing corresponding to the collected information, for example, the remote copy status.

In the technique disclosed in Patent Document 1, a storage as a copy source obtains a progress status in the course of remote copy. However, Patent Document 1 does not disclose any arrangement for providing the above-mentioned information to the host computer. Further, Patent Documents 2 and 3 describe techniques of efficient remote copy only, and does not describe acquisition of remote copy status information or the like of a remote storage.

Thus, in these techniques, a host computer can not know various kinds of information such as remote copy progress status in a remote storage.

The present invention solves the above-described problems, and it is an object of the present invention that a host computer obtains status information and the like of a remote storage that is not directly coupled to the host computer, through a simple interface.

To attain the above object, a storage subsystem according to the present invention is a storage subsystem in a computer system in which a plurality of storage subsystems are sequentially concatenated to a host computer and remote copy is performed between the above-mentioned plurality of storage subsystems, and the storage subsystem comprises a means which judges its own concatenation position, a means which sends received status information acquisition command, and a means which sends status information.

In detail, the storage subsystem comprises:

an interface which receives status information acquisition command and which sends status information from and to a storage subsystem (hereinafter, referred to as an upstream storage subsystem) that is located on a nearer side of the storage subsystem in question seen from the host computer and connected to the storage subsystem in question;

an outgoing status information storage unit which stores said status information (hereinafter, referred to outgoing status information) to be sent to said upstream storage subsystem;

a target storage subsystem judgment unit which judges whether a target storage subsystem (meaning a storage subsystem from which said status information is to be acquired) stored in the status information acquisition command received through said interface is the storage subsystem in question;

a command downstream sending unit which sends said status information acquisition command to a storage subsystem (hereinafter, referred to as a downstream storage subsystem) that is located on a farther side of the storage subsystem in question seen from the host computer and connected to the storage subsystem in question, when said target storage subsystem judgment unit judges that the storage subsystem in question is not said target storage subsystem from which said status information is to be acquired;

a self status information acquisition unit which acquires the status information of the storage subsystem in question and which stores the acquired status information as said outgoing status information into said outgoing status information storage unit, when said target storage subsystem judgment unit judges that the storage subsystem in question is said target storage subsystem from which said status information is to be acquired; and a downstream status information acquisition unit which receives the status information from said downstream storage subsystem and which stores the received status information as said outgoing status information into said outgoing status information storage unit;

and after said self status information acquisition unit or said downstream status information acquisition unit stores said outgoing status information into said outgoing status information storage unit, said interface sends said status information stored.

According to the present invention, using a simple interface, a host computer can acquire remote copy status information and the like of storage subsystems that are located at remote places without being directly coupled to the host computer.

BRIEF DESCRIPTION OF THE DRAWINGS

FIG. 8 is a diagram for explaining sequence status information in an embodiment of the present invention;

FIG. 9 is a diagram for explaining a status information acquisition command in an embodiment of the present invention;

FIG. 10 is a diagram for explaining a status information response in an embodiment of the present invention;

DESCRIPTION OF PREFERRED EMBODIMENTS

Now, embodiments of the present invention will be described referring to drawings.

Figure 1:
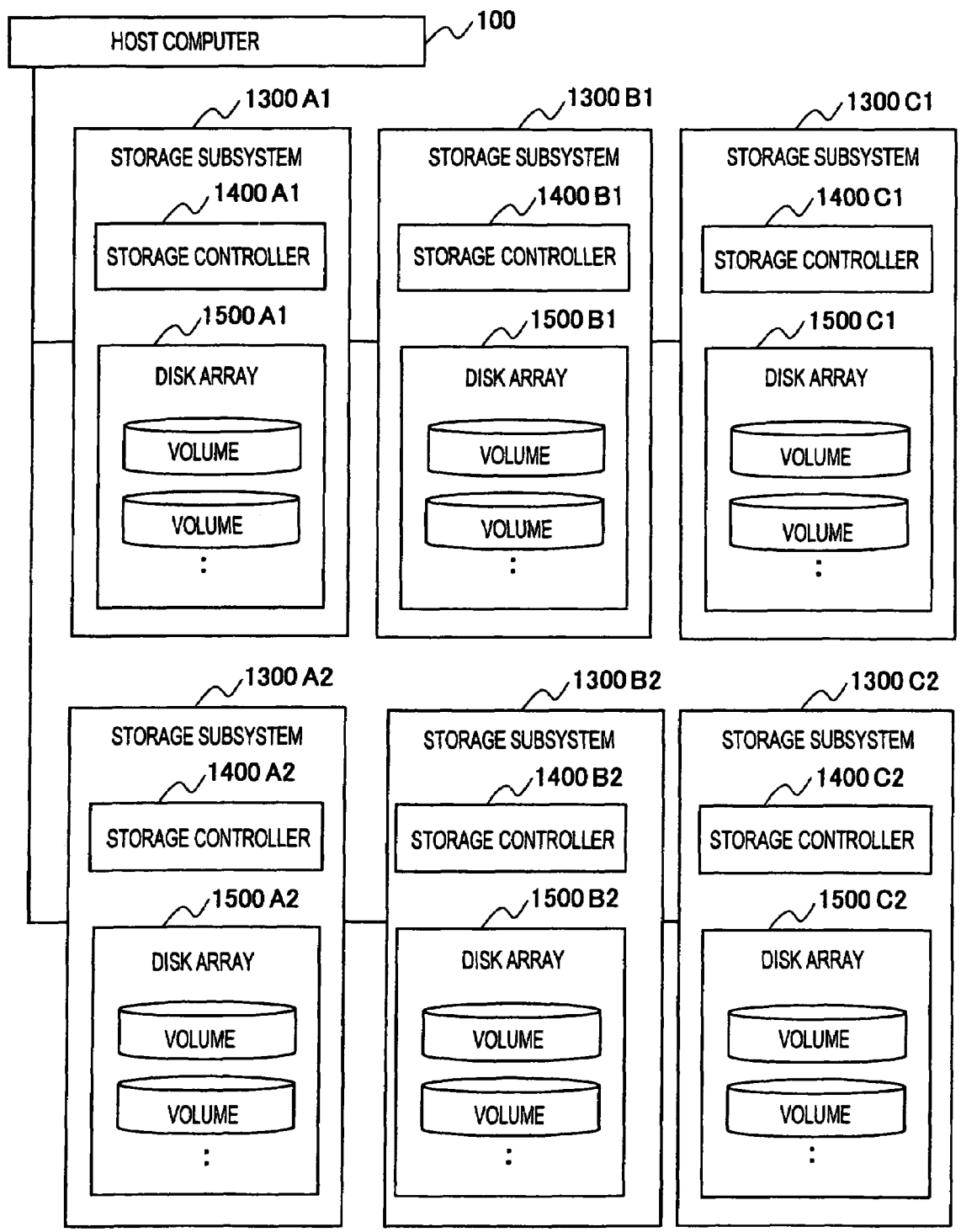
FIG. 1 is a block diagram showing a system configuration of a storage system of an embodiment of the present invention.

FIG. 1 is a block diagram showing a system configuration of the present embodiment.

A storage system of the present embodiment comprises a host computer 100, storage subsystems 1300A1, 1300B1, 1300C1, 1300A2, 1300B2 and 1300C2. Further, each storage subsystem comprises a storage controller 1400A1, 1400B1, 1400C1, 1400A2, 1400B2 or 1400C2, and a disk array 1500A1, 1500B1, 1500C1, 1500A2, 1500B2 or 1500C2.

The host computer 100 performs various kinds of processing, stores data into the storage subsystems belonging to the storage system, and manages all the storage subsystems belonging to the storage system.

In the present embodiment, the storage subsystems 1300A1 and 1300A2 are directly coupled to the host computer 100. In the present embodiment, this example having two storage subsystems directly coupled to the host computer 100 is described, although the number of storage subsystems coupled to a host computer is not limited to two. Hereinafter, the storage subsystems directly coupled to the host computer are called direct-coupled storage subsystems, to distinguish them from the other storage subsystems.

Further, the storage subsystems 1300B1 and 1300B2 are storage subsystems connected respectively to the direct-coupled storage subsystems 1300A1 and 1300A2. The storage subsystems 1300C1 and 1300C2 are storage subsystems connected respectively to the storage subsystems 1300B1 and 1300B2. These storage subsystems that are not directly coupled to the host computer are generally called remote storage subsystems. The remote subsystems are connected such that one or more storage subsystems are connected in series to one direct-coupled storage subsystem. The number of remote storage subsystems connected in series is not limited. Further, it is possible that a direct-coupled storage subsystem is not connected with a remote storage subsystem.

Data outputted from the host computer 100 to a direct-coupled storage subsystem 1300A1 or 1300A2 is remotely copied to storage subsystems 1300B1 and 1300C1 or 1300B2 and 1300C2 connected in series. When remote copy is performed from a direct-coupled storage subsystem to sequentially-concatenated storage subsystems, a set of the concatenated storage subsystems is called a sequence. Further, among storage subsystems in a sequence, a storage subsystem on the nearer side seen from the host computer is called upstream one and a storage subsystem on the farther side seen from the host computer is called downstream one.

In the present embodiment, the host computer can obtain information on a halfway status of remote copy. Thus, the present embodiment is described taking the example where the host computer obtains status information of remote copy, although the present invention is not limited to this. For example, a configuration similar to the present embodiment can obtain configuration information and log information of a remote storage subsystem.

Further, the storage subsystems 1300A1, 1300B1 and 1300C1 in a sequence are located at different data centers respectively. Each data center is located at a remote place, and connected with one another through a network of fiber channels, for example. Also the other sequence is arranged similarly.

When it is not necessary to distinguish an individual storage subsystem, an individual storage controller or an individual disk array, a representative expression such as "a storage subsystem 1300", "a storage controller 1400" or "a disk array 1500" is used in this description. Further, when it is not necessary to distinguish between the direct-coupled storage subsystems, "a direct-coupled storage subsystem 1300A" is used as a representative expression.

Next, functional configurations of the host computer 100 and a storage subsystem 1300 will be described.

Figure 2:
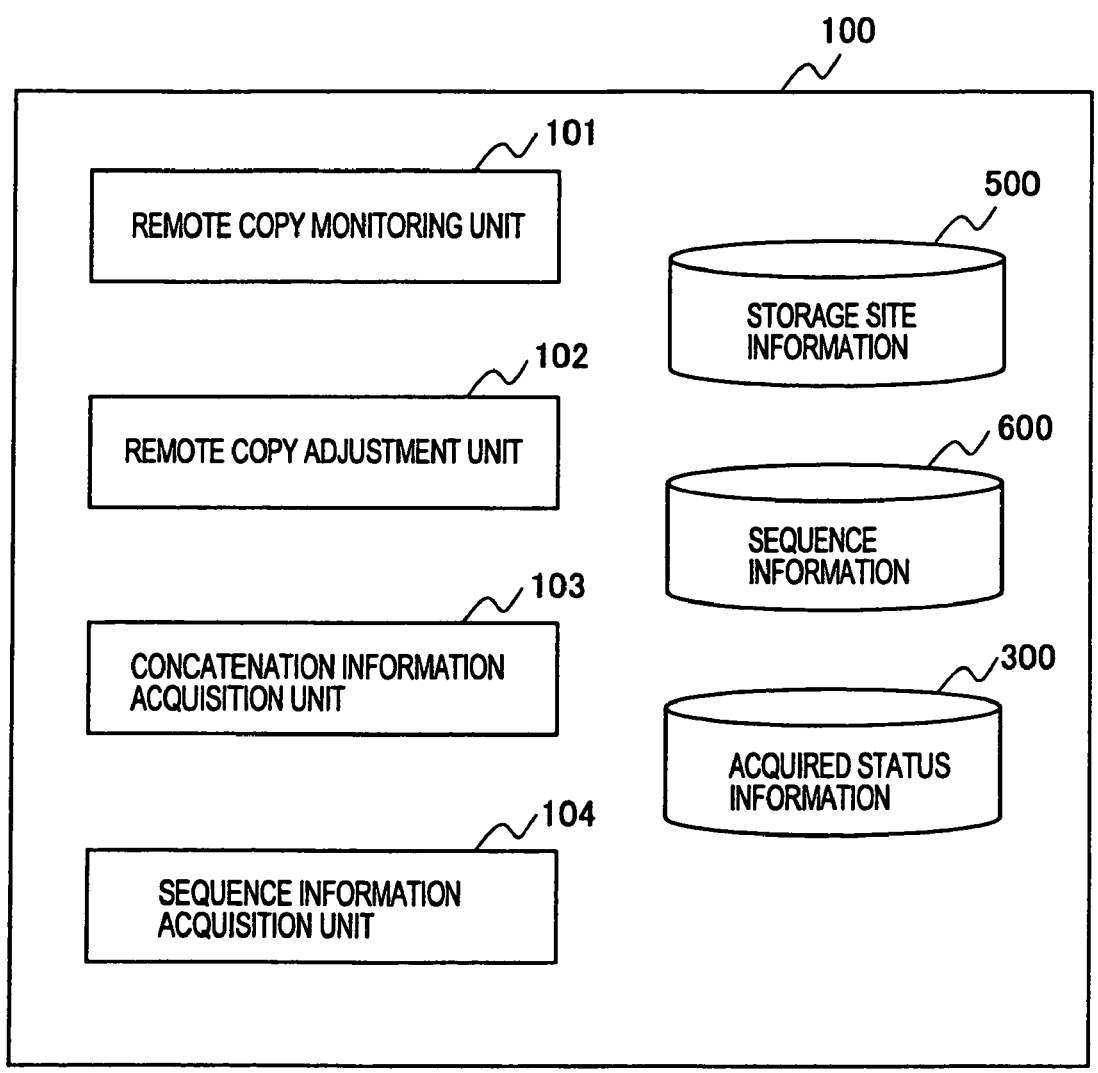
FIG. 2 is a block diagram showing a functional configuration of a host computer in an embodiment of the present invention.

FIG. 2 is a block diagram showing a functional configuration of the host computer 100.

As shown in the figure, the host computer 100 comprises a remote copy monitoring unit 101, a remote copy adjustment unit 102, a concatenation information acquisition unit 103, a sequence information acquisition unit 104, storage site information 500, sequence information 600, and acquired status information 300.

The concatenation information acquisition unit 103 receives information (inputted by an administrator) on a concatenation configuration of storage subsystems 1300, and generates and holds the storage site information 500.

Figures 5, 6, 7:
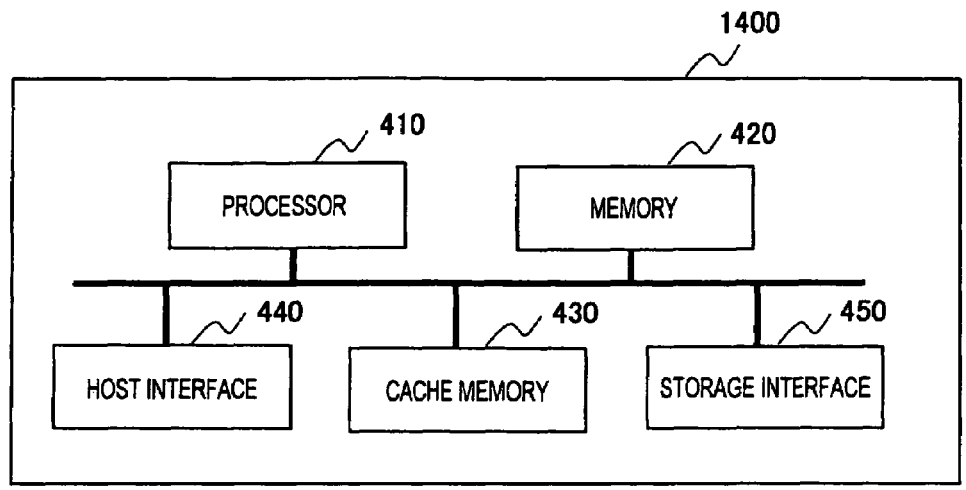
FIG. 5 is a block diagram showing a hardware configuration of a storage controller in an embodiment of the present invention.
FIG. 6 is a diagram for explaining information held as storage site information in an embodiment of the present invention.
FIG. 7 is a diagram for explaining sequence information in an embodiment of the present invention.

An example held as the storage site information 500 is shown in FIG. 6. As shown in the figure, the storage site information 500 includes: a concatenated storage site number 510 showing the number of storage subsystems 1300 concatenated in the sequence; a storage site identifier 530, i.e., information specifying each storage subsystem 1300 belonging to the sequence; and concatenation order information 520 indicating the concatenation order of the storage subsystems 1300 in the sequence.

In the present embodiment, consecutive natural numbers (in which a smaller number means an upstream storage subsystem 1300) are held as the concatenation order information 520. Namely, "1" is held for the direct-coupled storage subsystem 1300A1, "2" for the remote storage subsystem 1300B1 connected to the direct-coupled storage subsystem 1300A1, and "3" for the remote storage subsystem 1300C1 connected to the remote storage subsystem 1300B1. According to the concatenation order information, the concatenation configuration of the storage subsystems 1300 in each sequence can be grasped.

The sequence information acquisition unit 104 receives information (inputted by the administrator) on a concatenation configuration of a direct-coupled storage subsystem 1300A, and generates and holds the sequence information 600.

An example of the sequence information 600 is shown in FIG. 7. As shown in the figure, the sequence information 600 includes: a storage subsystem number 610 showing the number of direct-coupled storage subsystems 1300A concatenated to the host computer; a storage subsystem identifier 630, i.e., information specifying each direct-coupled storage subsystem 1300A; and connection order information 620 indicating the order of connection of the direct-coupled storage subsystems 1300A to the host computer. Referring to the sequence information 600, it is possible to know the storage subsystems 1300A directly coupled to the host computer.

The remote copy monitoring unit 101 obtains status information of all the storage subsystems 1300 in the storage system, through the direct-coupled storage subsystems 1300A, and monitors remote copy in each sequence, based on the status information.

In detail, when the remote copy monitoring unit 101 receives an instruction from a user through the below-mentioned input device 140 to acquire status information, then, the remote copy monitoring unit 101 generates a status information acquisition command 800 described below to acquire status information, and sends the generated status information acquisition command 800 to a direct-coupled storage subsystem 1300A. In the present embodiment, the remote copy monitoring unit 101 receives the following designation from the user, namely, designation of the type of status information to acquire, and the storage subsystem and the pair of volumes as the target from which status information is to acquire, and, when the below-mentioned interval processing is required, designation of the time interval.

Further, when status information is received from a direct-coupled storage subsystem 1300A, the received status information is held as the acquired status information 300. The acquired status information consists of the below-described status information acquisition command 800 and the status information sent from the direct-coupled storage subsystem 1300A.

The acquired status information 300 is displayed on the below-mentioned display device 150 by a display control unit not shown, or the like. From the displayed contents, the user can know the status information of the desired storage subsystem 1300.

Now, will be described a status information acquisition command 800 that is generated by the remote copy monitoring unit 101 to acquire status information of a storage subsystem belonging to the storage system managed by the host computer 100 that owns the remote copy monitoring unit 101 in question.

FIG. 9 shows an example of a status information acquisition command 800.

As shown in the figure, a status information acquisition command 800 includes: a command identifier storage part 860; a remote copy status acquisition command type storage part 810; an acquisition target identifier storage part 820; a pair identifier storage part 830; a type-of-information-to-acquire storage part 840; and an interval storage part 850.

The command identifier storage part 860 stores a command identifier as information for identifying a command. A command identifier is automatically given when a status information acquisition command 800 is generated, to uniquely identify each status information acquisition command. When status information is returned in response to a status information acquisition command 800, a storage subsystem 1300 that has received the status information acquisition command 800 gives the command identifier to the status information to be returned. Receiving status information from a direct-coupled storage subsystem 1300A, the remote copy monitoring unit 101 can judge for which status information acquisition command 800, the received status information is received in return.

The remote copy status acquisition command type storage part 810 stores a command type corresponding to a type of remote copy status to acquire. As a command type, the present embodiment prepares five types depending on: the target from which status information is to be acquired; whether status information is the newest or already-held information; and whether status information is to be accumulated at given time intervals.

Namely, the five command types are: (1) Specific-Newest Command, which gives an instruction of acquiring newest status information on a specific storage subsystem 1300; (2) Specific-Existing Command, which gives an instruction of acquiring status information that relates to a specific storage subsystem 1300 and that has been already acquired and is held in a direct-coupled storage subsystem 1300A; (3) Sequence-Newest Command, which gives an instruction of acquiring newest status information on all the storage subsystems 1300 belonging to a specific sequence; (4) Sequence-Existing Command, which gives an instruction of acquiring status information that relates to all the storage subsystems 1300 belonging to a specific sequence and that has been already acquired and held in the direct-coupled storage subsystem 1300A of the sequence in question; and (5) Regular-Interval-Sequence-Status Acquisition Command, which gives an instruction of accumulating the newest status information on all the storage subsystems 1300 belonging to a specific sequence at given time intervals into the direct-coupled storage subsystem 1300A. One of these types is stored in the remote copy status acquisition command type storage part 810.

Receiving a status information acquisition command 800, a storage subsystem 1300 performs processing which acquires status information, according to the command type stored in the remote copy status acquisition command type storage part 810 of the received status information acquisition command 800. Although the present invention takes an example where the above-described five types are prepared, command types are not limited to these. For example, there may be prepared a command type for acquiring status information on a specific storage subsystem 1300 at given intervals.

The acquisition target identifier storage part 820 stores information that specifies a storage subsystem 1300 or a sequence from which status information is acquired. In detail, referring to the storage site information 500, the storage site identifier 530 of the storage subsystem 1300 from which status information is acquired, the concatenation order information 520 corresponding to that storage site identifier 530, and the concatenated storage site number 510 are stored. Meaning of information stored in this storage part 820 differs depending on the command type stored in the remote copy status acquisition command type storage part 810.

For example, in the case where Specific-Newest Command or Specific-Existing Command, which gives an instruction of acquiring status information on a specific storage subsystem 1300, is stored, it is judged that the storage subsystem 1300 stored in the acquisition target identifier storage part 820 is the storage subsystem 1300 from which status information is acquired according to the status information acquisition command 800.

On the other hand, in the case where Sequence-Newest Command, Sequence-Existing Command or Regular-Interval-Sequence-Status Acquisition Command, which gives an instruction of acquiring status information of all the storage subsystems 1300 of a sequence, is stored, the acquisition target identifier storage part 820 stores the direct-coupled storage subsystem 1300A belonging to the sequence as the target which acquires status information. Thus, it is judged that a sequence whose top is the stored direct-coupled storage subsystem 1300 is the sequence as the target which acquires status information according to the status information acquisition command 800.

The type-of-information-to-acquire storage part 840 stores information that specifies which type of status information is to be acquired. The present embodiment prepares three types: Copy Status, which indicates a concordance rate of data between a pair of volumes in remote copy; Transfer Rate, which indicates a data transfer rate in remote copy; and Cache Usage, which indicates a usage rate of the cache of a storage subsystem. One or more of these types are designated.

The pair identifier storage part 830 stores information specifying a pair of volumes whose status information of remote copy is to acquire. This information is stored when a command type stored in the remote copy status acquisition command type storage part 810 is Specific-Newest Command or Specific-Existing Command, and the information stored in the type-of-information-to-acquire storage part 840 (i.e., the information that specifies which type of status information is to be acquired) is Copy Status or Transfer Rate.

The interval storage part 850 stores information relating to interval processing. Here, in the present embodiment, "interval processing" means processing of acquiring status information of all the storage subsystems 1300 of a sequence to update information of the below-mentioned sequence status information storage unit 700 held by the direct-coupled storage subsystem 1300A. Thus, the information relating to the interval processing is relevant only when the command type stored in the remote copy status acquisition command type storage part 810 is Regular-Interval-Sequence-Status Acquisition Command. In the present embodiment, in the case where the interval processing is performed, the interval storage part 850 stores the time interval of the interval processing. In the case of sending an instruction of stopping interval processing, a predetermined data, for example "0" is stored into the interval storage part 850.

According to an instruction received from a user through the below-mentioned input device 140, the remote copy adjustment unit 102 compares status information between sequences or storage subsystems 1300, and outputs a comparison result to the below-mentioned output device 150, for example. Based on the contents of the output, the user can change the below-mentioned intervals at which status information is acquired, break the remote copy processing itself, or detach a storage subsystem 1300.

Figure 4:
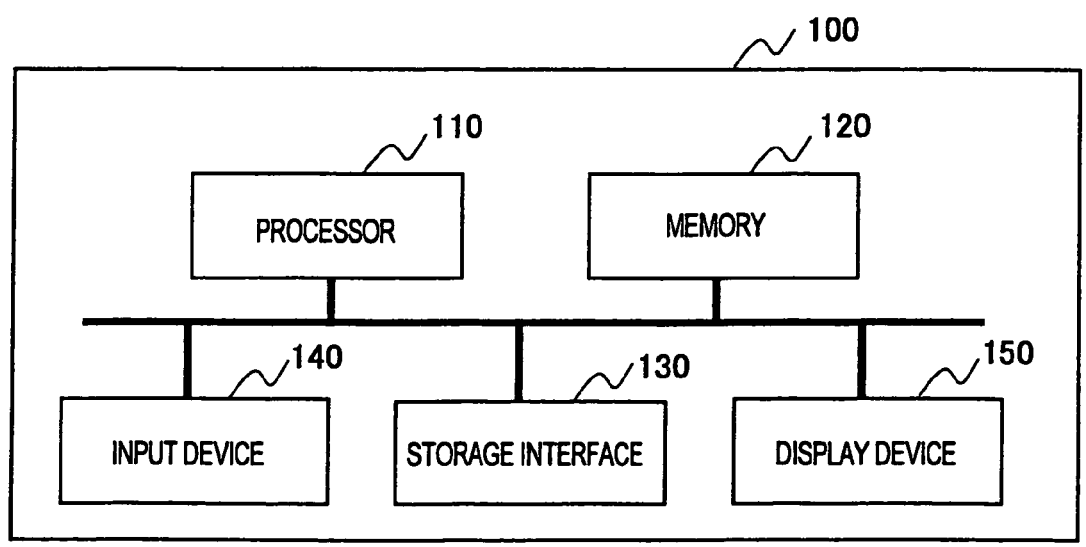
FIG. 4 is a block diagram showing a hardware configuration of a host computer in an embodiment of the present invention.

FIG. 4 shows a hardware configuration of the above-described host computer 100.

As shown in the figure, the host computer 100 comprises a processor 110, a memory 120, a storage interface 130, an input device 140 and a display device 150.

The above-described functions of the remote copy monitoring unit 101, the remote adjustment unit 102, the concatenation information acquisition unit 103 and the sequence information acquisition unit 104 are each realized when a program is stored in the memory 120 and executed by the processor 110. Further, the storage site information 500, the sequence information 600 and the acquired status information 300 are stored in the memory 120.

Next, a storage subsystem 1300 will be described. As shown in FIG. 1, a storage subsystem 1300 comprises a storage controller 1400 and a disk array 1500. The disk array 1500 stores information received from the host computer 100, includes volumes as a plurality of storage areas, and is managed in volumes.

The storage controller 1400 controls processing of storing information (received from the host computer) to the disk array 1500, remote copy processing destined to downstream storage subsystems connected to the storage subsystem 1300 of the storage controller 1400 itself, processing of acquiring status information, and other processing.

Figure 3:
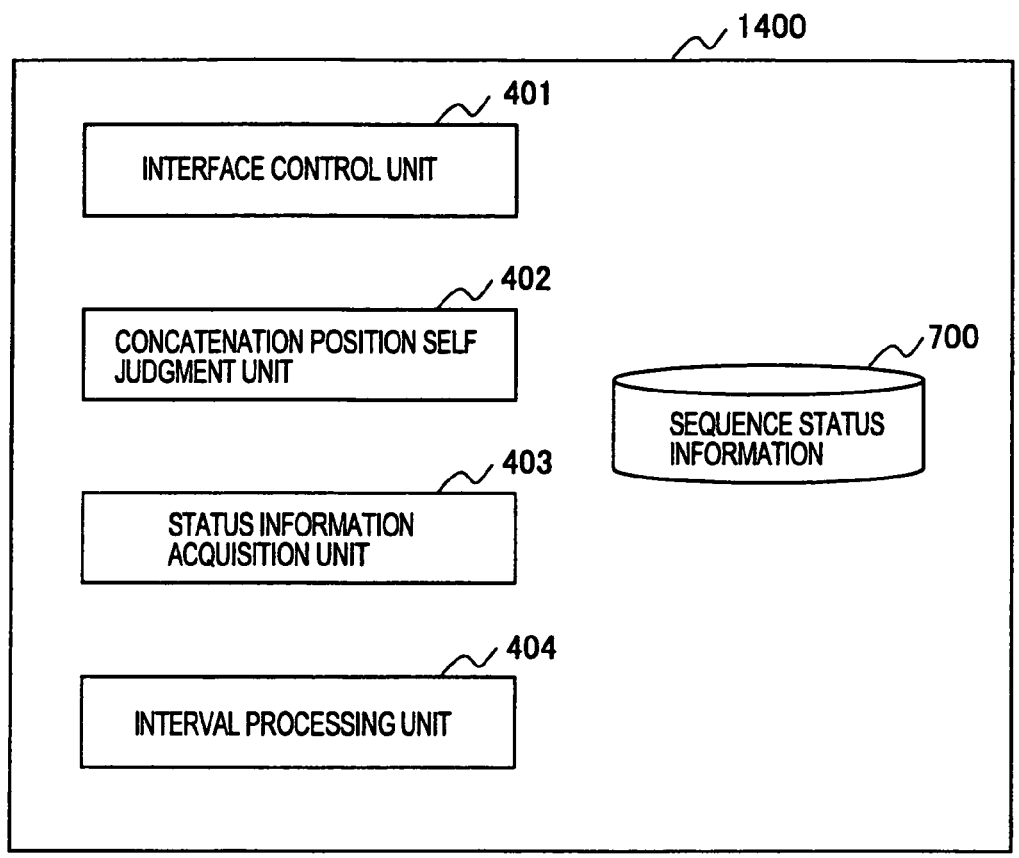
FIG. 3 is a block diagram showing a functional configuration of a storage controller in an embodiment of the present invention.

FIG. 3 shows a functional configuration of a storage controller 1400.

As shown in the figure, a storage controller 1400 comprises an interface control unit 401, a concatenation position self judgment unit 402, a status information acquisition unit 403, an interval processing unit 404 and sequence status information 700.

The status information acquisition unit 403 continuously monitors the inside status of its own storage subsystem 1300 in the course of remote copy, and holds a monitoring result as the sequence status information 700.

For example, the status information acquisition unit 403 acquires status information at given intervals, and uses the acquired status information to update the sequence status information 700. Further, when the status information acquisition unit 403 receives status information from a downstream storage subsystem 1300 than its own storage subsystem 1300, through the below-mentioned interface control unit 401, then, the status information acquisition unit 403 adds a new entry to the sequence status information 700 to store the status information.

Now, the sequence status information 700 will be described.

FIG. 8 shows an example of sequence status information 700. Here, by way of example, FIG. 8 shows sequence status information 700 held by a direct-coupled storage subsystem 1300A.

As shown in the figure, sequence status information 700 includes: a storage site information storage part 710 which stores storage site information that identifies two storage subsystems 1300 relating to remote copy; a volume identifier storage part 720 which stores volume identifiers of two disk arrays relating to remote copy; a status information storage part 730 which stores status information; and a update time storage part 740 which stores the time when the status information was updated. Further, the status information storage part 730 includes: a copy status storage part 731 which stores a remote copy progress; a transfer rate storage part 732 which stores a transfer rate of remote copy; and a cache usage storage part 733 which stores a usage rate of the cache memory.

The copy status storage part 731 may store copy status information such as a duplex state in which a pair relation of a pair of volumes is maintained, a suspended state in which a pair relation is suspended, or the like.

Further, when the storage site includes two storage subsystems 1300 as in the case where data is copied from the storage subsystem 1300A1 to the storage subsystem 1300B1 for example, the entries other than the copy status and the transfer rate are held by both the storage subsystems 1300 concerned, and the copy status and the transfer rate are held by the storage subsystem on the side of the copy source.

When the concatenation position self judgment unit 402 receives an instruction from the below-mentioned interface control unit 401, the concatenation position self judgment unit 402 extracts information in the acquisition target identifier storage part 820 to judge the concatenation position of its own storage subsystem 1300 in the sequence.

In detail, the concatenation position self judgment unit 402 judges its own concatenation position based on the concatenation order information 520 and the concatenated storage site number 510 stored in association with the storage site identifier 530 coincident with the storage site identifier 530 that is held in advance in the concatenation position self judgment unit 402 itself and that specifies its own storage subsystem 1300, among the storage site identifiers 530 stored in the acquisition target identifier storage part 820.

For example, when the concatenated storage site number 510 is "1" and its own concatenation order information 520 is "1", then, the concatenation position self judgment unit 402 judges that its own storage subsystem 1300 is directly coupled to the host computer and located at the end position. Or, in the case where the number of the concatenation stored in the concatenated storage site number 510 is "6", and the concatenation order shown by its concatenation order information 520 is "1", then, it is judged that its own storage subsystem 1300 is directly coupled to the host computer and is not located at the end position. Or, when the concatenation order is "6", it is judged that its own storage subsystem 1300 is located at the end position of the sequence.

The interface control unit 401 receives a status information acquisition command 800 from the host computer 100 or the upstream storage subsystem 1300 to its own storage subsystem 1300, and interprets and processes the received status information acquisition command 800. Further, when a status information response 900, which stores status information, from the downstream storage subsystem 1300 to its own storage subsystem 1300, then, the interface control unit 401 sends the received status information response 900 to the upstream storage subsystem 1300 or the host computer 100.

Here, a status information response 900 returned from a storage subsystem 1300 will be described.

FIG. 10 shows an example of a status information response 900. As shown in the figure, a status information response 900 includes a command identifier storage part 910, a status information storage part 920, a command type storage part 930, and an update time storage part 940.

When a status information acquisition command 800 is received, the interface control unit 401 extracts the above-mentioned command type stored in the remote copy status acquisition command type storage part 810 out of the status information acquisition command 800, to identify the command type.

In the case where the command type stored in the remote copy status acquisition command type storage part 810 is the above-mentioned Specific-Newest Command, the identifier stored in the acquisition target identifier storage part 820 is extracted, to judge whether the storage subsystem 1300 specified as the target of acquisition is its own storage subsystem 1300.

When its own storage subsystem 1300 is specified, a status information response 900 is generated. Out of the information held as the sequence status information 700 by the status information acquisition unit 403, the status information designated by the received status information acquisition command 800 and the update time corresponding to the status information are received and stored respectively into the status information storage part 920 and the update time storage part 940 of the generated status information response 900. Further, the command identifier and the command type stored respectively in the command identifier storage part 860 and the remote copy status acquisition command type storage part 810 are stored into the command identifier storage part 910 and the command type storage part 930 of the status information response 900. Then, the status information response 900 is sent to the upstream storage subsystem 1300 connected to the storage subsystem 1300 in question. Here, in the case where the storage subsystem 1300 in question is a direct-coupled storage subsystem 1300A, the status information response 900 is sent to the host computer.

In the case where the storage subsystem 1300 designated as the target of acquisition is not its own storage subsystem 1300, then, the interface control unit 401 sends the status information acquisition command 800 to the downstream storage subsystem 1300 connected to its own storage subsystem 1300.

In the case where the storage subsystem 1300 to which the interface control unit 401 belongs (i.e., its own storage subsystem 1300) is an end (i.e., the lowest) storage subsystem 1300, and the storage subsystem 1300 designated as the target of acquisition is not its own storage subsystem 1300, then, the received status information acquisition command 800 is discarded.

In the case where the command type stored in the remote copy status acquisition command type storage part 810 is the above-mentioned Specific-Existing Command, the interface control unit 401 extracts the identifier stored in the acquisition target identifier storage part 820 and the identifier stored in the pair identifier storage part 830, to confirm whether the status information of the storage subsystem 1300 and the pair of volumes designated as the target of acquisition is stored in the sequence status information 700 held by the storage subsystem 1300 of its own.

In the case where the sequence status information 700 stores the status information in question, a status information response 900 is generated. And, according to the information type stored in the type-of-information-to-acquire storage part 840, the relevant status information and the update time in the sequence status information 700 are stored into the status information storage part 920 and the update time storage part 940 of the generated status information response 900. Further, the command identifier and the command type stored respectively in the command identifier storage part 860 and the remote copy status acquisition command type storage part 810 of the received status information acquisition command 800 are stored respectively into the command identifier storage part 910 and the command type storage part 930 of the status information response 900. Then, the status information response 900 is sent to the host computer 100.

In the case where the status information of the storage subsystem 1300 and the pair of volumes designated as the target of acquisition is not stored in the sequence status information 700 held by the storage subsystem 1300 of its own, the processing of the above-described case where Specific-Newest Command is received is performed.

In the case where no status information of the storage subsystem 1300 specified as the target of acquisition is stored in the sequence status information 700, the interface control unit 401 discards the status information acquisition command 800.

In the case where the command type stored in the remote copy status acquisition command type storage part 810 is the above-mentioned Sequence-Newest Command, the interface control unit 401 confirms the information stored in the acquisition target identifier storage part 820 to specify the target of acquisition. In the case where the storage subsystem 1300 to which the interface control unit 401 itself belongs (i.e., its own storage subsystem) is a direct-coupled storage subsystem 1300A and the information stored in the acquisition target identifier storage part 820 indicates its own storage subsystem 1300A, then, the interface control unit 401 sends the status information acquisition command 800 to the downstream storage subsystem 1300 connected to its own storage subsystem 1300A.

In the case where the storage subsystem 1300 of its own is not a direct-coupled storage subsystem 1300A, the interface control unit 401 sends the status information acquisition command 800 to the downstream storage subsystem 1300 connected to the storage subsystem 1300 of its own, unless the concatenation position self judgment unit 402 judges that the storage subsystem 1300 of its own is an end storage subsystem 1300.

In the case where the storage subsystem 1300 of its own is judged to be an end storage subsystem 1300, a status information response 900 is generated and sent to the upstream storage subsystem 1300 connected to the storage subsystem 1300 of its own. Here, information stored in each storage part of the status information response is same as the above-described case of Specific-Newest Command.

In the case where the command type stored in the remote copy status acquisition command type storage part 810 is the above-mentioned Sequence-Existing Command, then, the interface control unit 401 confirms the information stored in the acquisition target identifier storage part 820 to specify the target of acquisition. In the case where the storage subsystem 1300 to which the interface control unit 401 itself belongs (i.e., its own storage subsystem) is a direct-coupled storage subsystem 1300A and the information stored in the acquisition target identifier storage part 820 indicates its own storage subsystem 1300A, the interface control unit 401 stores the status information that is held by its own storage subsystem 1300A and that relates to all the storage subsystems 1300 of the sequence into the status information response 900, to send the status information response 900 to the host computer 100.

At that time, the command identifier storage part 910 and the command type storage part 930 store the corresponding information stored in the received status information acquisition command 800. And, the status information storage part 920 and the update time storage part 940 store the corresponding information of all the storage subsystems 1300 and the pairs of volumes stored in the sequence status information 700 held by the storage subsystem 1300A of its own.

Further, in the case where the command type stored in the remote copy status acquisition command type storage part 810 is Regular-Interval-Sequence-Status Acquisition Command, and its own storage subsystem 1300 is judged to be an end storage subsystem 1300, then, the interface control unit 401 extracts the information of the interval storage part 850 of the received status information acquisition command 800, and delivers the extracted information to the below-mentioned interval processing unit 404.

In the present embodiment, in the case where the interval storage part 850 stores the time interval at which the interval processing is performed, it means that status information is acquired at the time intervals, each interval having the value stored in the interval storage part 850. On the other hand, in the case where the interval storage part 850 stores "0", it means an instruction of stopping the interval processing.

Further, the interface control unit 401 receives a status information response 900 from the downstream storage subsystem 1300.

First, the interface control unit 401 makes the status information acquisition unit 403 store the status information of the received status information response 900 into the sequence status information storage unit 700 of its own storage subsystem 1300. Then, referring to the command type storage part 930 of the received status information 900, the interface control unit 401 judges the type of the command according to which the status information response 900 in question has been sent.

In the case where it is judged that the status information response 900 has been sent according to Specific-Newest Command or Specific-Existing Command and the storage subsystem of its own is not a direct-coupled storage subsystem 1300A, then, the interface control unit 401 extracts again the status information stored in the received status information response 900 from the status information stored in the sequence status information 700, and composes a status information response 900 to send the composed status information response 900 as it is to the upstream storage subsystem 1300 connected to its own storage subsystem 1300. When its own storage subsystem 1300 is a direct-coupled storage subsystem 1300A, the composed status information 900 is sent to the host computer 100.

Or, the following arrangement may be employed here. Namely, when it is judged that the status information response 900 has been sent according to Specific-Newest Command or Specific-Existing Command, then, the status information response 900 received from the downstream storage subsystem 1300 is sent as it is to the upstream storage subsystem 1300 or to the host computer 100.

Further, when it is judged that the received status information response 900 has been sent according to Sequence-Newest Command, Sequence-Existing Command, or Regular-Interval-Sequence-Status Acquisition Command, and its own storage subsystem 1300 is not a direct-coupled storage subsystem 1300A, then, using its own status information and the status information of all the downstream storage subsystems stored in the sequence status information 700, the status information and the update time designated in the status information acquisition command 800 are extracted to compose a status information response 900. Then, the composed status information response 900 is sent to the upstream storage subsystem 1300 connected to its own storage subsystem 1300. On the other hand, when its own storage subsystem 1300 is a direct-coupled storage subsystem 1300A, the composed status information response 900 is sent to the host computer 100.

The interface control unit 401 makes the status information acquisition unit 403 add the status information of the downstream storage subsystems 1300 stored in the received status information response 900 to the sequence status information 700, and sends the received status information response 900 to the upstream storage subsystem 1300 connected to its own storage subsystem 1300. In the case of Sequence-Newest Command and when its own storage subsystem is a direct-coupled storage subsystem 1300A, then, the received status information response 900 is sent to the host computer 100.

The interval processing unit 404 holds a timer for measuring time. When the information on the time interval for the interval processing is received from the interface control unit 401, the interval processing unit 404 starts to measure time anew. When time of the received time interval elapses, the interval processing unit 404 instructs the interface control unit 401 to perform the processing. On the other hand, when, as the information on the interval processing, "0" is received from the interface control unit 401, then, the interval processing unit 404 stops the time measurement using the timer, to stop the interval processing.

FIG. 5 shows a hardware configuration of the above-described storage controller 1400 of a storage subsystem 1300.

As shown in the figure, the storage controller 1400 comprises a processor 410, a memory 420, a cache memory 430, a host interface 440 and a storage interface 450.

The above-described functions of the interface control unit 401, the concatenation position self judgment unit 402, the status information acquisition unit 403 and the interval processing unit 404 are each realized when a program is stored in the memory 420 and executed by the processor 410. Further, the sequence status information 700 is stored in the memory 420.

Next, will be described processing performed when the host computer 100 requests status information from a storage subsystem 1300.

Figure 11:
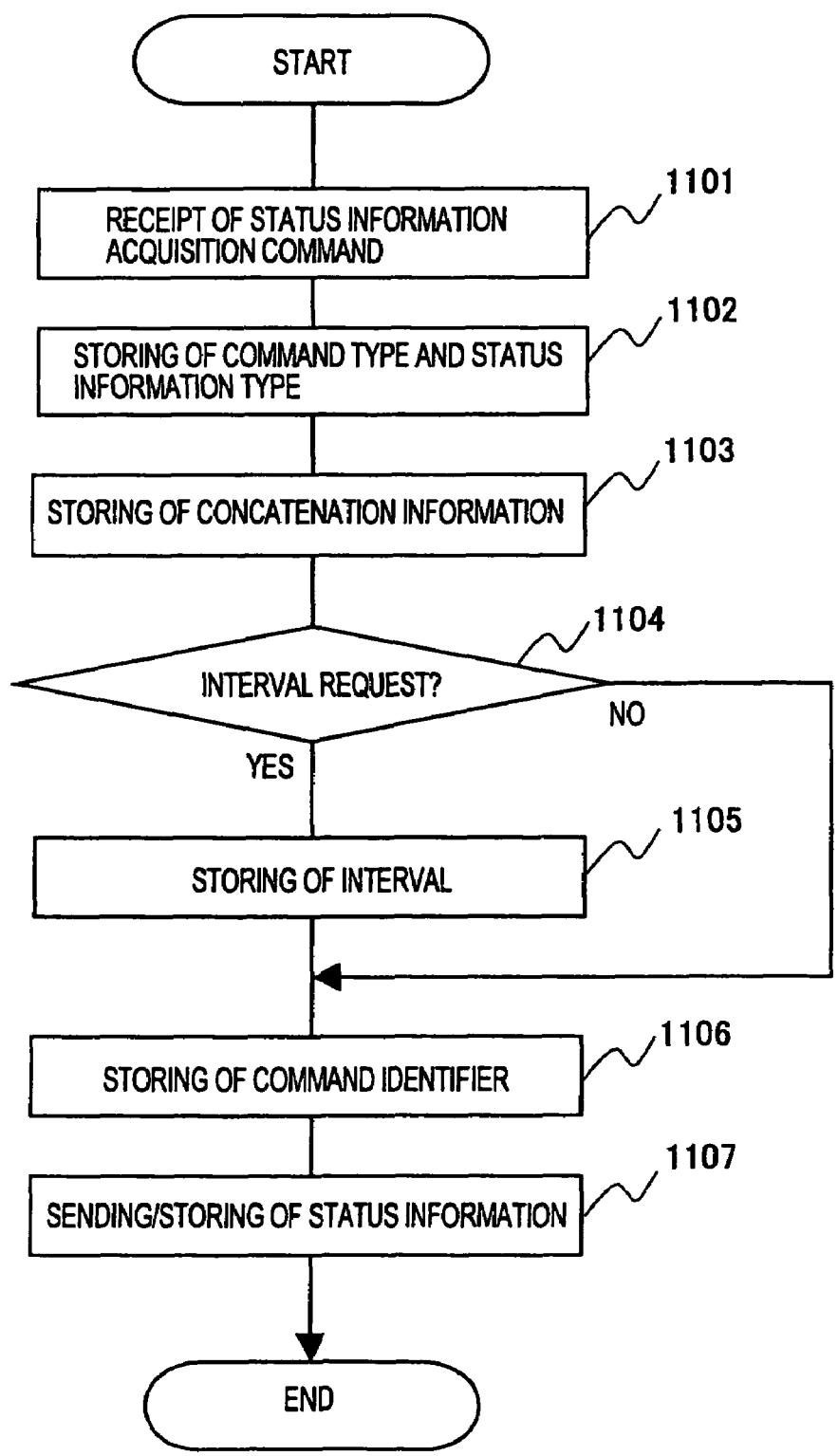
FIG. 11 is a flowchart showing status information request processing performed in a host computer in an embodiment of the present invention.

FIG. 11 is a flowchart for explaining the processing performed when the host computer 100 requests status information.

When the remote copy monitoring unit 101 receives an instruction from a user through the input device 140, to acquire status information (Step 1101), then, the remote copy monitoring unit 101 generates a status information acquisition command 800 according to the received instruction.

First, the remote copy status acquisition command type and the type of the status information to acquire, shown in the instruction received from the user, are stored into the remote copy status acquisition command type storage part 810 and the type-of-information-to-acquire storage part 840, respectively (Step 1102).

Next, from the storage site information 500, the remote copy monitoring unit 101 acquires the concatenation information on the storage subsystem 1300 whose status information is to acquire according to the instruction received from the user, and stores the acquired information into the acquisition target identifier storage part 820. The remote copy monitoring unit 101 also stores the pair of volumes which acquire according to the instruction received from the user into the pair identifier storage part 830 (Step 1103)

Then, it is judged whether designation of the time interval of the interval processing or stopping of the interval processing has been received (Step 1104). In the case where such designation has been received, the received time interval of the interval processing or "0" is stored into the interval storage part 850 (Step 1105).

Next, the remote copy monitoring unit 101 stores a command identifier, which is automatically given to uniquely identifying the status information acquisition command 800, into the command identifier storage part 860 (Step 1106).

Last, the status information acquisition command 800 generated is send to a direct-coupled storage subsystem 1300A connected to the host computer 100 itself, and the generated status information acquisition command 800 is stored into the acquired status information 300 (Step 1107).

Next, will be described processing performed when the host computer 100 receives status information from a direct-coupled storage subsystem 1300.

Figure 12:
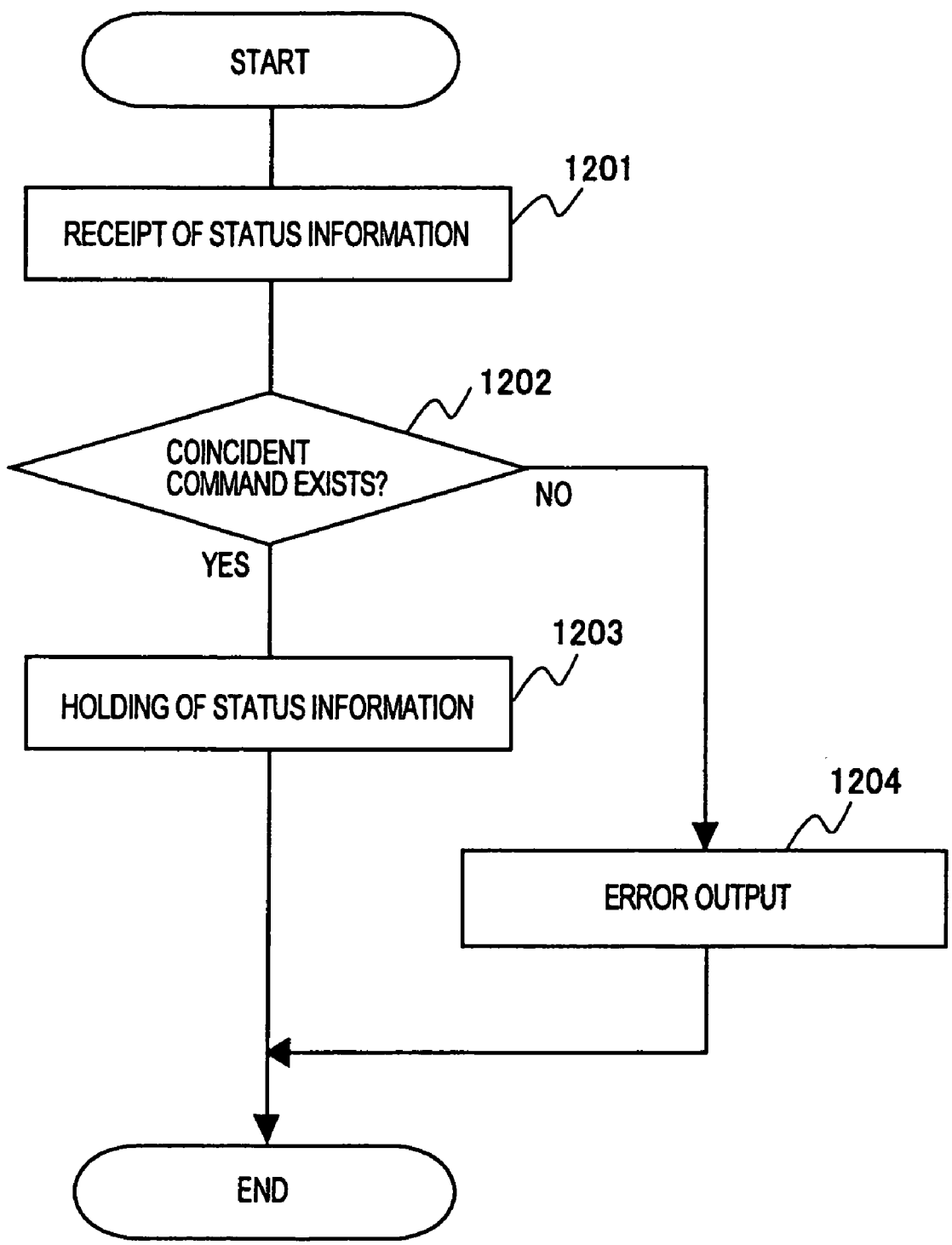
FIG. 12 is a flowchart showing processing performed in a host computer when status information is acquired in an embodiment of the present invention.

FIG. 12 shows a processing flow for explaining the processing performed when the host computer 100 receives status information.

When a status information response 900 is received from a direct-coupled storage subsystem 1300A (Step 1201), the remote copy monitoring unit 101 extracts a command identifier from the command identifier storage part 910 of the received status information response 900, and compares the extracted command identifier with command identifiers of status information acquisition commands 800 sent from the remote copy monitoring unit 101 and stored in the acquired status information 300 (Step 1202).

When there is found a command identification that agrees with the extracted command identifier, then, the remote copy monitoring unit 101 holds the received status information response 900 as the acquired status information 300, i.e., as a reply to the status information acquisition command 800 of the found command identification (Step 1203).

Where there is not found a command identifier that agrees with the extracted command identification, then, the remote copy monitoring unit 101 outputs "error" to the display device 150 (Step 1204).

Next, will be described processing performed by the storage controller 1400 of a storage subsystem 1300 when a status information acquisition command 800 is received.

Figure 13:
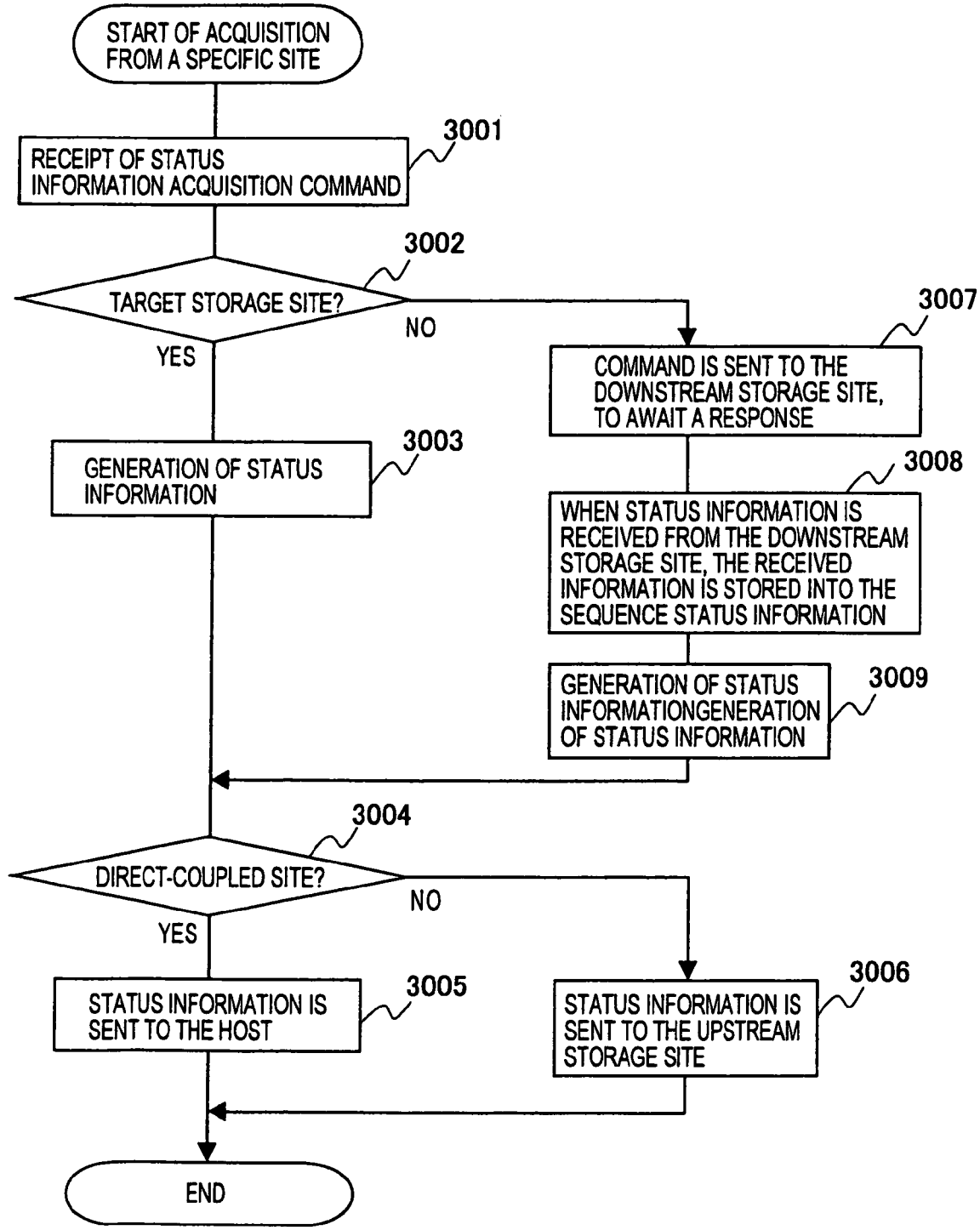
FIG. 13 is a flowchart showing processing performed in a storage subsystem when a status information acquisition command including Specific-Newest Command is received in an embodiment of the present invention.

FIG. 13 shows a processing flow for explaining the processing performed when Specific-Newest Command is stored in the remote copy status acquisition command type storage part 810 of the received status information acquisition command 800.

When the interface control unit 401 receives the status information acquisition command 800 (Step 3001), the interface control unit 401 refers to the acquisition target identifier storage part 820 to judge whether its own storage subsystem 1300 is the storage subsystem 1300 as the target of acquisition (Step 3002).

In the case where its own storage subsystem 1300 is the target of acquisition, then, the interface control unit 401 acquires the designated status information from the sequence status information 700 held in the status information acquisition unit 403 to compose a status information response 900 (Step 3003).

Next, the interface control unit 401 makes the concatenation position self judgment unit 402 judge the concatenation position of its own storage subsystem (Step 3004). When its own storage subsystem is judged to be a direct-coupled storage subsystem 1300A, the interface control unit 401 sends the status information response 900 to the host computer 100 (Step 3005). When it is judged that its own storage subsystem is not a direct-coupled storage subsystem 1300A, then, the interface control unit 401 sends the status information response 900 to the upstream storage subsystem 1300 connected to its own storage subsystem (Step 3006).

Next, in the case where it is judged that its own storage subsystem is not the storage subsystem 1300 as the target of acquisition in Step 3002, then, the interface control unit 401 sends the status information acquisition command 800 to the downstream storage subsystem 1300 connected to its own storage subsystem 1300, to await return of a status information response 900 (Step 3007).

When a status information response 900 is received from the storage subsystem 1300 connected to its own storage subsystem, then, the interface control unit 401 adds the received status information to the sequence status information 700 (Step 3008), and composes a new status information response 900 from the added status information (Step 3009), to proceeds to Step 3004.

In the case where Specific-Existing Command is stored in a status information acquisition command 800, then, when a direct-coupled storage subsystem 1300A receives the status information acquisition command 800, the status information of the designated storage subsystem 1300 is extracted from the sequence status information 700 held by the direct-coupled storage subsystem 1300A itself, to send the extracted status information to the host computer 100. However, when the direct-coupled storage subsystem 1300A does not hold the sequence status information 700, then, the direct-coupled storage subsystem 1300A performs the processing of the above-described case where a status information acquisition command 800 including Specific-Newest Command is received.

Next, will be described processing performed when Sequence-Newest Command is stored in the remote copy status acquisition command type storage part 810 of the received status information acquisition command 800.

Figure 14:
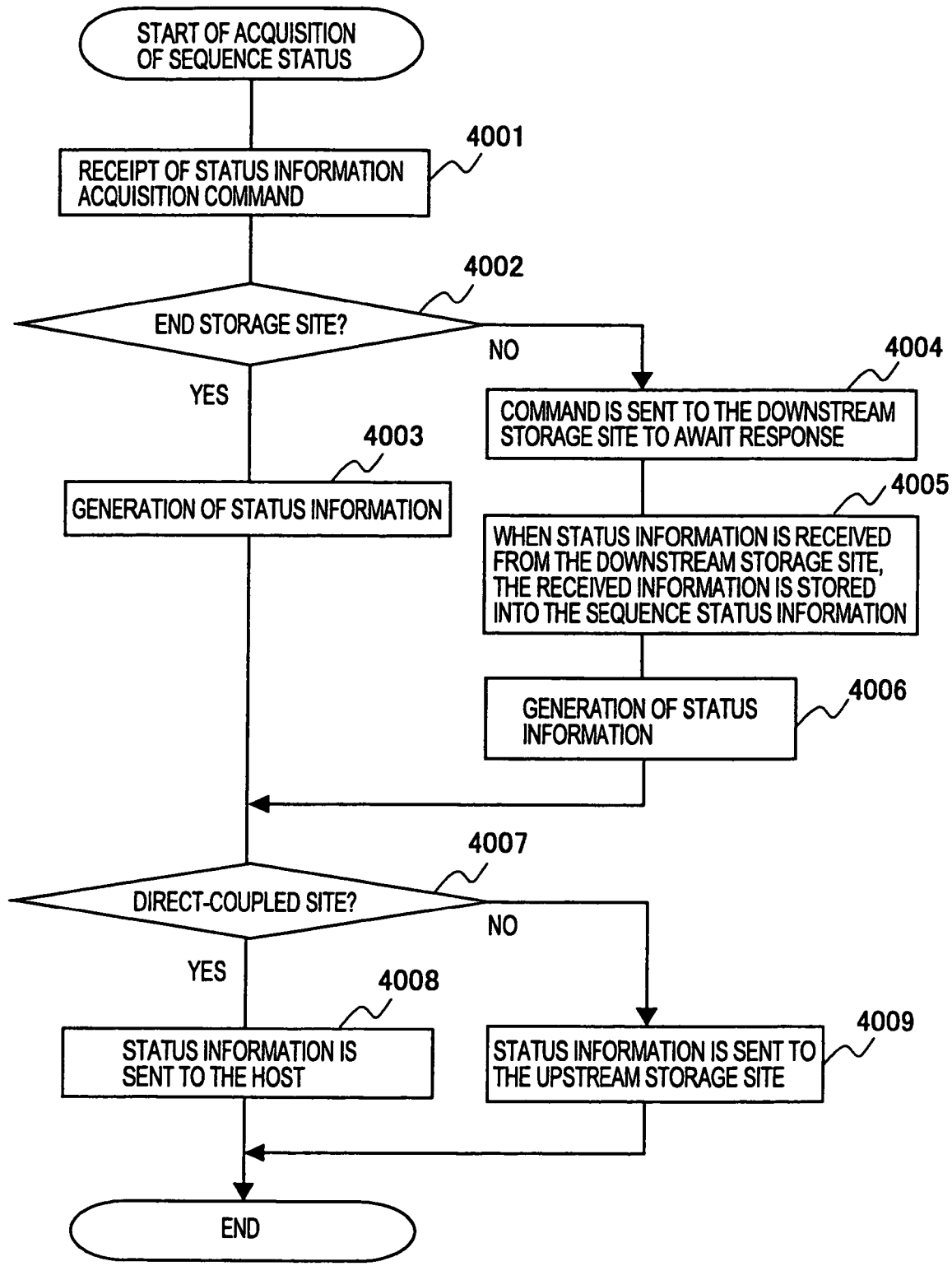
FIG. 14 is a flowchart showing processing performed in a storage subsystem when a status information acquisition command including Sequence-Newest Command is received in an embodiment of the present invention.

FIG. 14 shows a processing flow in the case of receiving the status information acquisition command 800 that stores Sequence-Newest Command.

When the interface control unit 401 receives the status information acquisition command 800 (Step 4001), the interface control unit 401 makes the concatenation position self judgment unit 402 judge the concatenation position of its own storage subsystem 1300 (Step 4002).

When it is judged that its own storage subsystem is a storage subsystem 1300 connected at the end of the sequence, then, the designated status information is acquired from the sequence status information 700 held by the status information acquisition unit 403 to compose a status information response 900 (Step 4003).

In Step 4002, when it is judged that its own storage subsystem is not a storage subsystem 1300 connected at the end of the sequence, then, the interface control unit 401 sends the status information acquisition command 800 to the downstream storage subsystem 1300 connected to its own storage subsystem and awaits return of a status information response 900 (Step 4004).

When a status information response 900 is received from the storage subsystem 1300 on the downstream side of its own storage subsystem, then, the interface control unit 401 adds the received status information to the sequence status information 700 (Step 4005). Further, using the information stored in the sequence status information 700, the interface control unit 401 composes a new status information response 900 based on the status information of its own and of all the storage subsystems 1300 on the downstream side (Step 4006).

Next, the interface control unit 401 makes the concatenation position self judgment unit 402 judge the concatenation position of its own storage subsystem 1300 (Step 4007). When it is judged that its own storage subsystem 1300 is a direct-coupled storage subsystem 1300A, then, the interface control unit 401 sends the status information response 900 to the host computer 100 (Step 4008). On the other hand, when it is judge that its own storage subsystem 1300 is not a direct-coupled storage subsystem 1300A, then, the interface control unit 401 sends the status information response 900 to the upstream storage subsystem 1300 connected to its own storage subsystem 1300 (Step 4009).

In the case where Sequence-Existing Command is stored in a status information acquisition command 800, then, when a direct-coupled storage subsystem 1300A receives the status information acquisition command 800, the sequence status information 700 held by the direct-coupled storage subsystem 1300A itself is sent to the host computer 100. However, when the direct-coupled storage subsystem 1300A does not hold the sequence status information 700, then, the direct-coupled storage subsystem 1300A performs the processing of the above-described case where a status information acquisition command 800 including Sequence-Newest Command is received.

Next, will be described processing performed when Regular-Interval-Sequence-Status Acquisition Command is stored in the remote copy status acquisition command type storage part 810 of the received status information acquisition command 800.

Figure 15:
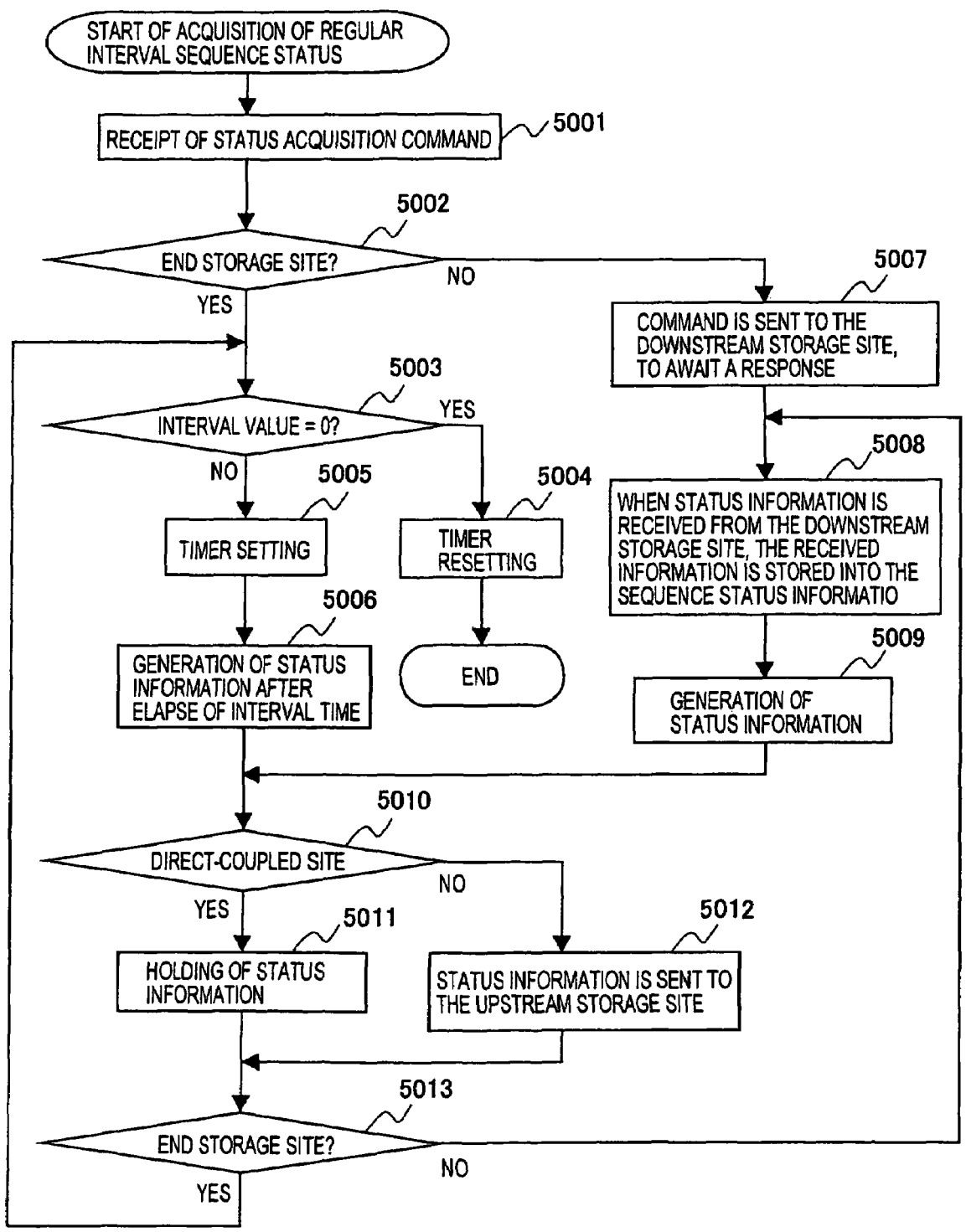
FIG. 15 is a flowchart showing processing performed in a storage subsystem when a status information acquisition command including Regular-Interval-Sequence-Status Acquisition Command is received in an embodiment of the present invention.

FIG. 15 shows a processing flow in the case of receiving the status information acquisition command 800 that stores Regular-Interval-Sequence-Status Acquisition Command.

When the interface control unit 401 receives the status information acquisition command 800 (Step 5001), the interface control unit 401 makes the concatenation position self judgment unit 402 judge the concatenation position of its own storage subsystem 1300 (Step 5002).

When it is judged that its own storage subsystem 1300 is a storage subsystem 1300 connected at the end of the sequence, then, the interface control unit 401 extracts the time interval stored in the interval storage part 850 (Step 5003).

Here, when "0" is stored in the interval storage part 850, the interface control unit 401 makes the interval processing unit 404 reset the timer (Step 5004), and ends the processing.

When it is found in Step 5003 that a time interval other than "0" is stored, then, the interval control unit 401 makes the interval processing unit 404 set the stored time interval into the timer (Step 5005).

When the interface control unit 401 receives a notice from the interval processing unit 404 to the effect that the interval set in the timer has elapsed, then, the interface control unit 401 acquires the designated status information from the sequence status information 700 held by the status information acquisition unit 403 to compose a status information response 900 (Step 5006).

Further, when it is judged in Step 5002 that its own storage subsystem 1300 is not a storage subsystem 1300 connected to the end of the sequence, then, the interface control unit 401 sends the status information acquisition command 800 to the downstream storage subsystem 1300 connected to its own storage subsystem, and awaits return of a status information response 900 (Step 5007).

When a status information response 900 is received from the downstream storage subsystem 1300 connected to its own storage subsystem 1300, the interface control unit 401 adds the received status information to the sequence status information 700 (Step 5008). And, using the information stored in the sequence status information 700, the interface control unit 401 composes a new status information response 900 based on the status information of its own and of all the storage subsystems 1300 on the downstream side (Step 5009).

Next, the interface control unit 401 makes the concatenation position self judgment unit 402 judge the concatenation position of its own storage subsystem 1300 (Step 5010). When it is judged that its own storage subsystem 1300 is a direct-coupled storage subsystem 1300A, then, the interface control unit 401 holds the status information stored in the status information response 900 (Step 5011). On the other hand, when it is judged that its own storage subsystem 1300 is not a direct-coupled storage subsystem 1300A, then, the status information response 900 is sent to the upstream storage subsystem 1300 connected to its own storage subsystem 1300 (Step 5012).

Next, the interface control unit 401 makes the concatenation position self judgment unit 402 judge the concatenation position of its own storage subsystem 1300 (Step 5013). When its own storage subsystem 1300 is an end storage subsystem 1300, the processing flow returns to Step 5008. On the other hand, when it is judged that its own storage subsystem is not an end storage subsystem 1300, the processing flow returns to Step 5008 to await receipt of a status information response 900 from the downstream storage subsystem connected to its own storage subsystem 1300.

Hereinabove, has been described the processing performed when Regular-Interval-Sequence-Status Acquisition Command is stored in the received status information acquisition command 800.

Next, will be described remote copy adjustment processing performed when the host computer 100 receives the status information of a plurality of sequences connected to the host computer 100 itself.

Figure 16:
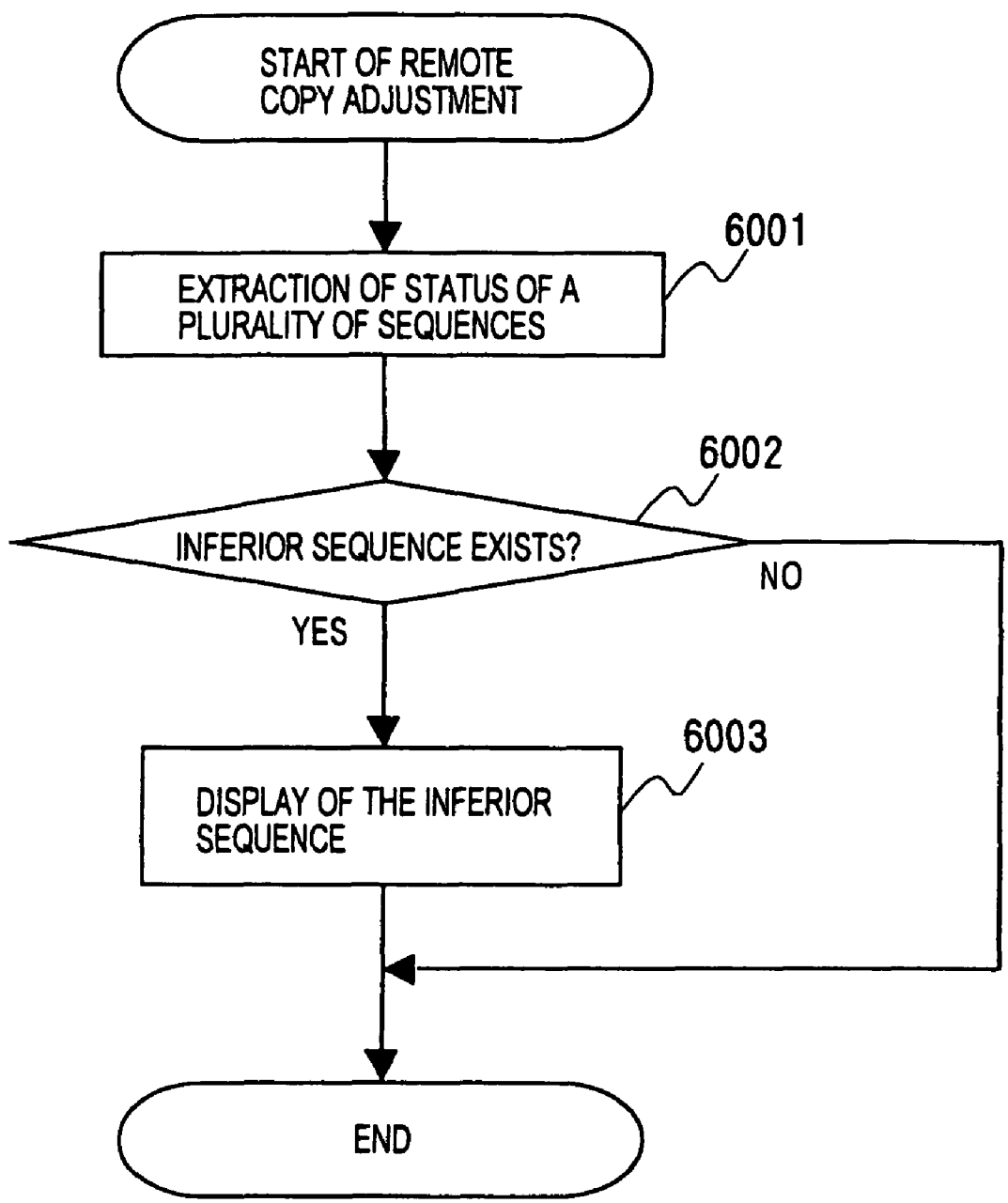
FIG. 16 is a flowchart showing adjustment processing performed in a remote copy adjustment unit in an embodiment of the present invention.

FIG. 16 shows a flow of the adjustment processing by the remote copy adjustment unit 102.

When an instruction of adjustment is received from a user through the input device 140, the remote copy adjustment unit 102 refers to the acquired status information 300 to extract data having the same status information type and the same update time as ones stored in the status information storage part 920 and the update time storage part 940 of a received status information response 900, from the status information of each sequence (Step 6001).

Among the extracted data, the remote copy adjustment unit 102 extracts a sequence having status information that indicates its remote copy load is increasing. For example, in the case where the status information type stored in the type-of-information-to-acquire storage part is Transfer Rate, it is judged whether there is a sequence in which a value of the transfer rate is less than a predetermined threshold of the transfer rate. Or, in the case of Cache Usage, it is judged whether there is a sequence in which a value of the cache usage rate is more than a predetermined threshold of the cache usage rate (Step 6002).

In the case where there is no sequence that satisfies the condition in Step 6002, then, the processing is ended without doing anything further.

In the case where there is a sequence that satisfies the condition in Step 6002, the remote copy adjustment unit 102 makes the display device 150 display the relevant sequence (Step 6003). Here, a storage subsystem 1300 having a lower transfer rate or a higher cache usage rate as described above is possibly a storage subsystem 1300 whose remote copy load is increasing or whose performance is decreasing. Thus, the user can cope with this by watching display on the display device 150 to frequently perform remote copy supervisory control of the storage subsystem in question, or by lengthening the time interval of a status information acquisition command 800 that includes Regular-Interval-Sequence-Status Acquisition Command to reduce a load that the processing of collecting status information gives on the storage controller 1400, for example.

Here, in the case where there is prepared, for example, a command for acquiring the sequence information of all the sequences connected to the host computer 100 in such a way that the status information is acquired in the connection order stored in the sequence information 600, then, the remote copy adjustment unit 102 may change values of the connection order information 620 of the sequence information 600 of the sequence in question such that the status information of the sequence in question is acquired prior to the status information of the other sequences.

As described above, according to the storage system of the present embodiment, the host computer 100 can collect status information of a desired storage subsystem or a pair of volumes through a simple interface, out of the storage subsystems 1300 of a sequence for which remote copy is managed generally. Further, it is possible to generally acquire the status information of all the storage subsystems 1300 belonging to that sequence, through a simple interface.

Further, it is possible to find a storage subsystem for which the load at remote copy is increasing and to notify a user of it to attract user's attention.

Further, since status information acquired generally for each of a plurality of sequences is held and the held status information is presented to a user, the user can know a sequence for which the load at remote copy is increasing. Based on the presented information, the user can remove the degraded sequence from the general monitoring or can adjust remote copy for improving the status.

As described above, according to the present embodiment, the host computer can request and collect the following status information through a simple interface: namely, the remote copy status information of a storage subsystem that is located at a remote place and not directly coupled to the host computer; the status information of all the storage subsystems in a sequence; and the status of all the storage subsystems of a plurality of sequences.

Further, according to the present embodiment, it is also possible to employ similar method to acquire various kinds of information, such as configuration information and log information, of a storage subsystem that is located at a remote place and not directly coupled to the host computer.

What is claimed is:

1. A storage system, comprising:
a first storage device having a first controller and a plurality of first disk drives, at least one of said first disk drives being related to a first logical volume as a first primary logical volume;
said first controller receiving data targeted to said first logical volume and storing said data targeted to said first logical volume into said at least one of said first disk drives and transferring data related to said data targeted to said first logical volume to a second logical volume in a second storage device by a first remote copy process;
said second storage device having a second controller and a plurality of second disk drives, at least one of said second disk drives being related to said second logical volume as a secondary logical volume of said first logical volume;
said second controller receiving data transferred from said first storage device and storing said data transferred from said first storage device into said at least one of said second disk drives;
a third storage device having a third controller and a plurality of third disk drives, at least one of said third disk drives being related to a third logical volume as a second primary logical volume; and
said third controller receiving data targeted to said third logical volume and storing data into said at least one of said third disk drives and transferring data related to said data targeted to said third logical volume by a second remote copy process;
wherein an information processing device displays information of said first and second storage devices among said first, second and third storage devices, if a parameter of said first remote copy process of said first and second storage devices satisfies a condition relative to a predetermined threshold.

2. A storage system according to claim 1, wherein:
said displayed information indicates a relationship between said first and second storage devices.

3. A storage system according to claim 1, wherein:
said information processing device has a pair status of between said first and second logical volumes, and
said pair status is whether it is under copying of data from said first logical volume to a second logical volume or not.

4. A storage system according to claim 1, further comprising:
a fourth storage device having a fourth controller and a plurality of fourth disk drives, at least one of said fourth disk drives being related to a fourth logical volume as a secondary logical volume of said third logical volume; and
said fourth controller receiving data, which are transferred from said third storage device and targeted to said fourth logical volume, and storing said data transferred from said third storage device into said at least one of said fourth disk drives;
wherein said information processing device has a pair status of said third logical volume and said forth logical volume, and
wherein said pair status is a relationship between said third logical volume and said fourth logical volume.

5. A storage system according to claim 1, wherein:
said information processing device has a pair status of said third logical volume and a fourth logical volume in a fourth storage device, and
said pair status is whether it is under copying of data from said third logical volume to said fourth storage device or not.

6. A storage system according to claim 1, further comprising:
a fifth storage device having a fifth controller and a plurality of fifth disk drives, at least one of said fifth disk drives being related to a fifth logical volume as a third secondary volume of said second logical volume; and
said fifth controller receiving data, which are transferred from said second storage device and targeted to said fifth logical volume by a third remote copy process, and storing said data transferred from said second storage device into said at least one of said fifth disk drives;
wherein said information processing device has a pair status of said fifth logical volume, and
wherein said pair status is whether it is under copying of data to said fifth logical volume or not.

7. A storage system according to claim 1, wherein:
said information processing device has a pair status of said first and second logical volumes, and
said pair status indicates a duplex status between said first logical volume and said second logical volume.

8. A storage system according to claim 1, wherein:
said information processing device has a pair status of said first and second logical volumes, and
said pair status indicates a suspend status between said first logical volume and a second logical volume.

9. A storage system according to claim 1, wherein:
said information processing device has information, which is used to identify said first logical volume from said first, second and third logical volumes.

10. A storage system according to claim 1, wherein:
said information processing device has information of said first storage device, said second storage device and said third storage device.

11. A storage system according to claim 1, wherein:
said condition relates to performance of said first and second storage device for said first remote copy process.

12. A storage system according to claim 1, wherein:
said condition is whether a data transfer rate of said first remote copy process is over the predetermined threshold value or not.

13. A storage system according to claim 1, wherein:
said condition is whether a cache usage rate of said first remote copy process is over the predetermined threshold value or not.

14. A storage system, comprising:
a first storage device having a first controller and a plurality of first disk drives, at least one of said first disk drives being related to a first logical volume as a primary logical volume;
said first controller receiving data targeted to said first logical volume and storing said data targeted to said first logical volume into said at least one of said first disk drives and transferring data related to said data targeted to said first logical volume to a second logical volume in a second storage device by a first remote copy process;
said second storage device having a second controller and a plurality of second disk drives, at least one of said second disk drives being related to said second logical volume as a first secondary logical volume of said first logical volume;
said second controller receiving data, which are transferred from said first storage device and targeted to said second logical volume, and storing said data transferred from said first storage device into said at least one of said second disk drives and transferring data related to said data transferred from said first storage device to a third logical volume in a third storage device by a second remote copy process;
said third storage device having a third controller and a plurality of third disk drives, at least one of said third disk drives being related to said third logical volume as a second secondary logical volume; and
said third controller receiving data, which are transferred from said second storage device and targeted to said third logical volume, and storing said data transferred from said second storage device into said at least one of said third disk drives;
a fourth storage device having a fourth controller and a plurality of fourth disk drives, at least one of said fourth disk drives being related to a fourth logical volume as a second primary volume; and
said fourth controller receiving data targeted to said fourth logical volume and storing data into said at least one of said fourth disk drives and transferring data related to said data targeted to said fourth logical volume by a third remote copy process;
wherein an information processing device displays information of said first, second and third storage devices among said first, second, third and fourth storage devices, if a parameter of said first and/or second remote copy processes of said first, second and third storage devices satisfy a condition of a remote copy process relative to a predetermined threshold.

15. A storage system according to claim 14, wherein:
said condition relates to performance of said first, second and/or third storage devices for said first and/or second remote copy processes.

16. A storage system according to claim 14, wherein:
said condition is whether a data transfer rate of said first and/or second remote copy processes are/is over the predetermined threshold value or not.

17. A storage system according to claim 14, wherein:
said condition is whether a cache usage rate of said first and/or second remote copy processes are/is over the predetermined threshold value or not.

18. A storage system, comprising:
a first storage device having a plurality of first disk drives, at least one of said first disk drives being related to a first logical volume;
a first controller, in said first storage device, receiving data targeted to said first logical volume and storing said data targeted to said first logical volume into said first logical volume and transferring data related to said data targeted to said first logical volume by a first remote copy process;
a second storage device having a plurality of second disk drives, at least one of said second disk drives being related to a second logical volume;
a second controller, in said second storage device, receiving data, which are transferred from said first storage device by said first remote copy process, and storing said data transferred from said first storage device to said second logical volume;
a third storage device having a plurality of third disk drives, at least one of said third disk drives being related to a third logical volume; and
a third controller, in said third storage device, receiving data targeted to said third logical volume and storing said data targeted to said third logical volume into said third logical volume and transferring data related to said data targeted to said third logical volume by a second remote copy process;
a fourth storage device having a plurality of fourth disk drives, at least one of said fourth disk drives being related to a fourth logical volume; and
a fourth controller, in said fourth storage device, receiving data, which are transferred from said third storage device by said second remote copy process, and storing said data transferred from said third storage device to said fourth logical volume;
wherein an information processing device displays information of said first and second storage devices among said first, second, third and fourth storage devices, if a parameter of said first remote copy process of said first and second storage devices satisfy a condition of a remote copy process relative to a predetermined threshold.

19. A storage system according to claim 18, wherein:
said condition relates to performance of said first and second storage device for said first remote copy process.

20. A storage system according to claim 18, wherein:
said condition is whether a data transfer rate of said first remote copy process is over the predetermined threshold value or not.

21. A storage system according to claim 18, wherein:
said condition is whether a cache usage rate of said first remote copy process is over the predetermined threshold value or not.

22. A storage system, comprising:

a first storage device and comprising a first controller and a plurality of first disk drives, at least one of said first disk drives being related to a first logical volume;

said first controller comprising a first communication interface, a first disk interface and a first cache memory, said first controller receiving data targeted to said first logical volume via said first communication interface and temporarily storing said data received via said first communication interface into said first cache memory and transferring said data stored in said first cache memory to said at least one of said first disk drives via said first disk interface;

a second storage device comprising a second controller and a plurality of second disk drives, at least one of said second disk drives being related to a second logical volume;

said second controller comprising a second communication interface, a second disk interface and a second cache memory, said second controller receiving data targeted to said second logical volume via said second communication interface and temporarily storing said data received via said second communication interface into said second cache memory and transferring said data stored in said second cache memory to said at least one of said second disk drives via said second disk interface;

a third storage device comprising a third controller and a plurality of third disk drives, at least one of said third disk drives being related to a third logical volume;

said third controller comprising a third communication interface, a third disk interface and a third cache memory, said third controller receiving data targeted to said third logical volume via said third communication interface and temporarily storing said data received via said third communication interface into said third cache memory and transferring said data stored in said third cache memory to said at least one of said third disk drives via said third disk interface;

a fourth storage device comprising a fourth controller and a plurality of fourth disk drives, at least one of said fourth disk drives being related to a fourth logical volume; and said fourth controller comprising a fourth communication interface, a fourth disk interface and a fourth cache memory, said fourth controller receiving data targeted to said fourth logical volume via said fourth communication interface and temporarily storing said data received via said fourth communication interface into said fourth cache memory and transferring said data stored in said fourth cache memory to said at least one of said fourth disk drives via said fourth disk interface;

wherein said first controller receives data and transfers data related to said received data to said second storage device, wherein said third controller receives data and transfers data related to said received data to said fourth storage device;

wherein an information processing device displays information of said first and second storage devices among said first, second, third and fourth storage devices, if a data transfer rate between said first and second storage devices among said first, second, third and fourth storage devices satisfies a predetermined threshold.

* * * * *